United States Patent [19]
Choromokos

[11] 3,973,600
[45] Aug. 10, 1976

[54] METHOD AND APPARATUS FOR FEEDING, CUTTING, STRIPPING, COILING AND TYING OFF ELONGATED FLEXIBLE MATERIAL

[76] Inventor: Robert L. Choromokos, 118 Edward St., Northlake, Ill. 60164

[22] Filed: Jan. 6, 1975

[21] Appl. No.: 538,555

[52] U.S. Cl. .............................. 140/1; 140/92.2; 81/9.51; 100/12
[51] Int. Cl.² ............................................ B21F 3/00
[58] Field of Search .......... 140/1, 92.2, 93 A, 93.6, 140/140; 100/3, 12, 5; 81/9.51; 72/131, 146

[56] References Cited
UNITED STATES PATENTS

| | | | |
|---|---|---|---|
| 1,995,105 | 3/1935 | Poole | 140/92.2 |
| 2,251,776 | 8/1941 | Ballard | 140/92.2 |
| 2,703,026 | 3/1955 | Basile et al. | 81/9.51 |
| 3,021,874 | 2/1962 | Lyon et al. | 140/92.2 |
| 3,108,922 | 10/1963 | Possis et al. | 140/92.2 |
| 3,368,428 | 2/1968 | Gudmestad | 81/9.51 |
| 3,384,006 | 5/1968 | Helligrath et al. | 140/93.6 |

*Primary Examiner*—Lowell A. Larson

[57] ABSTRACT

This invention relates generally to the art of coiling elongated flexible material, and specifically to a system which includes a method and apparatus for continuously and repetitively forming, at one time, one or more discrete of descrete lengths of elongated flexible material from a source of material greater in length than any discrete length, each of said coils being tied off individually preparatory to discharge from the system.

12 Claims, 19 Drawing Figures

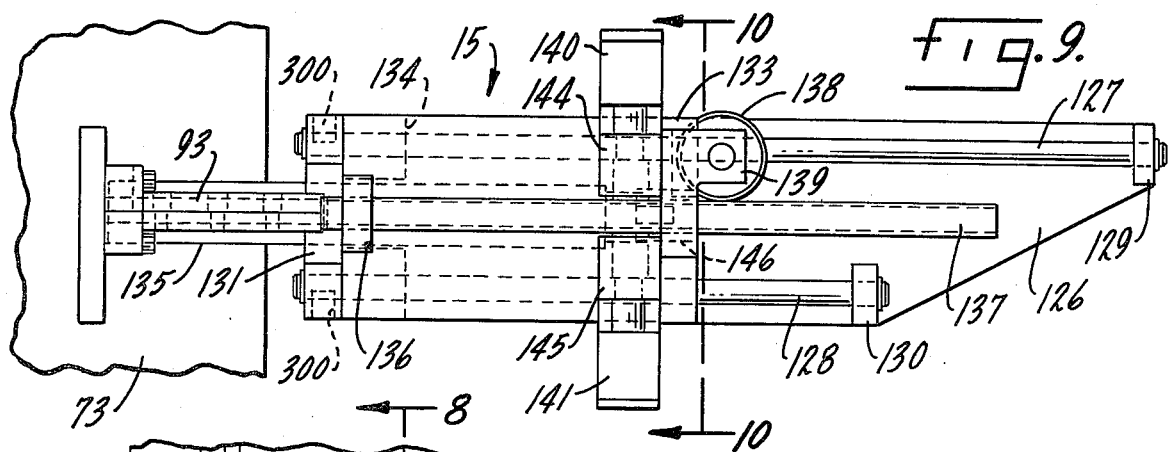
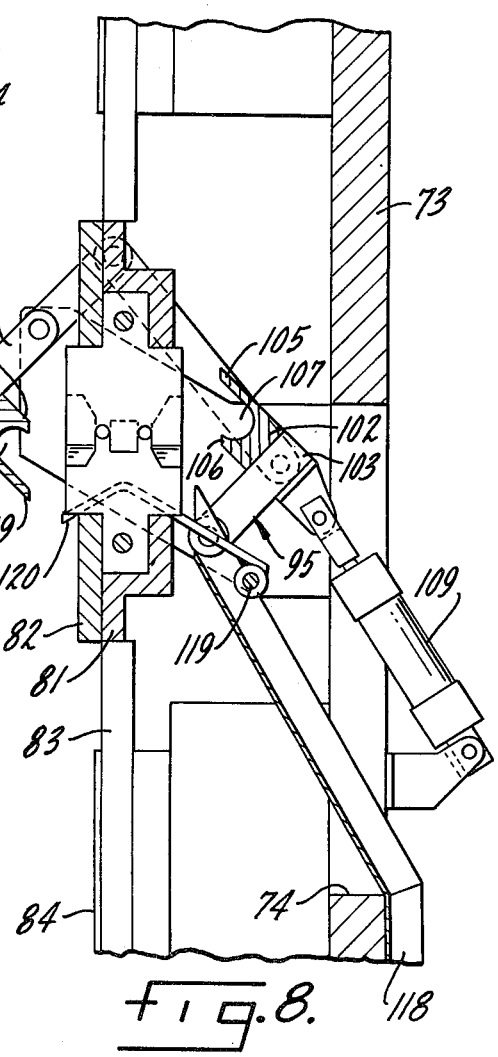
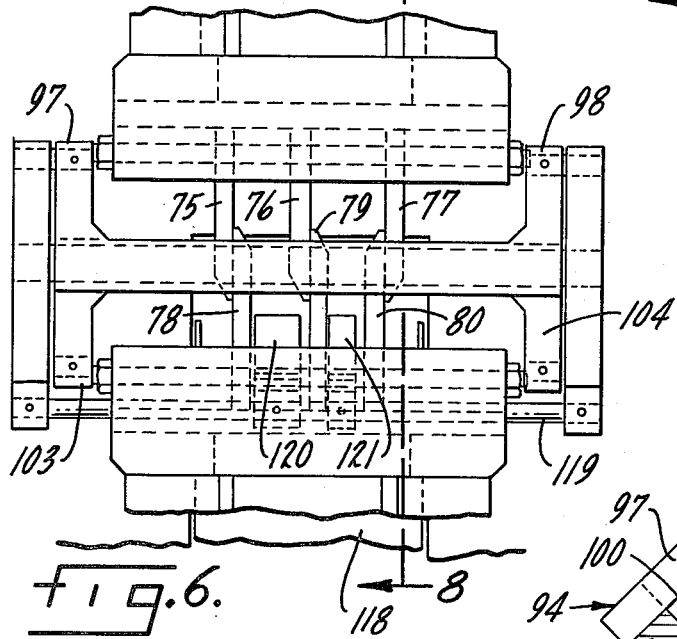
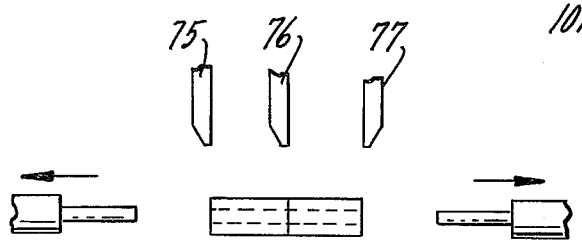

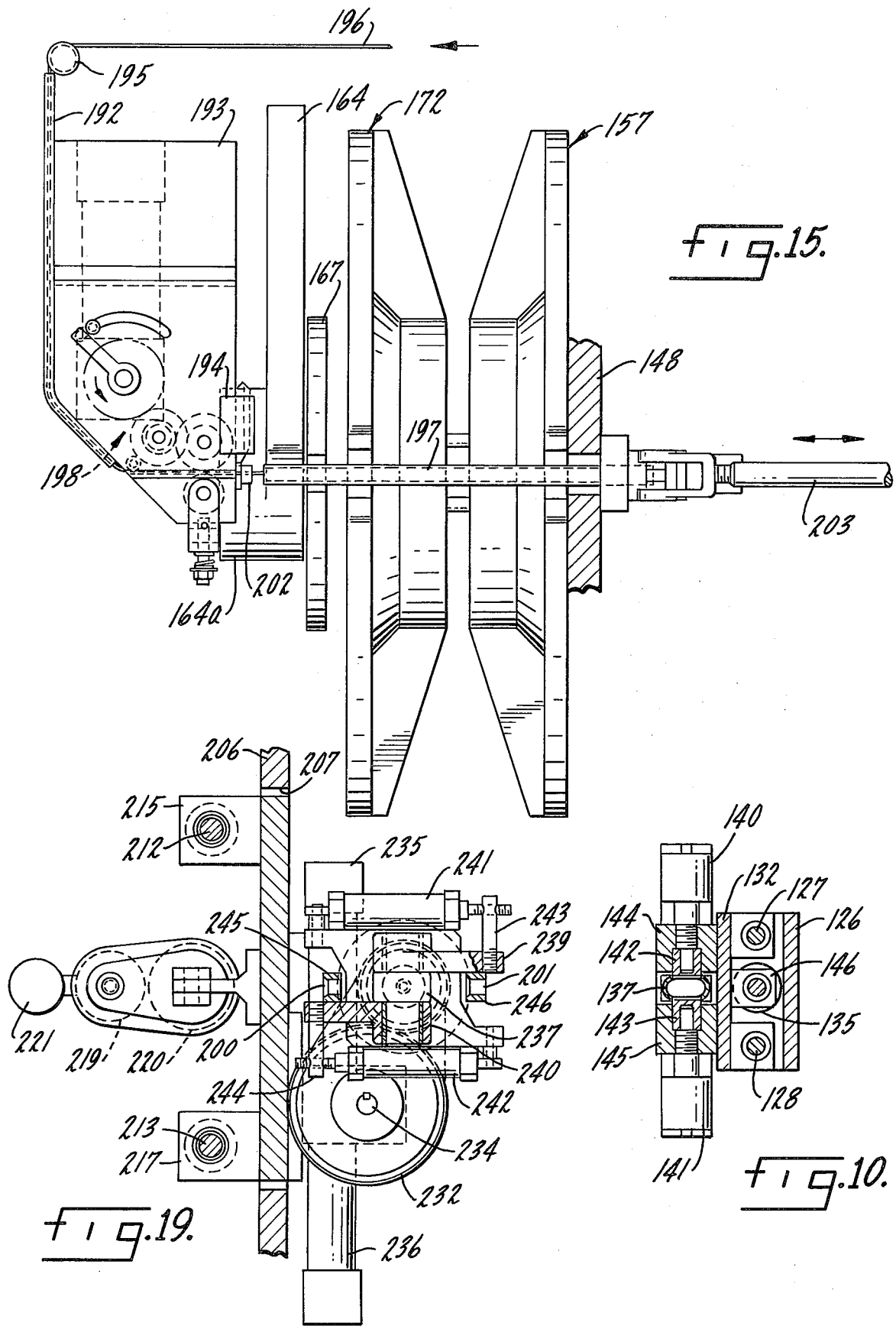

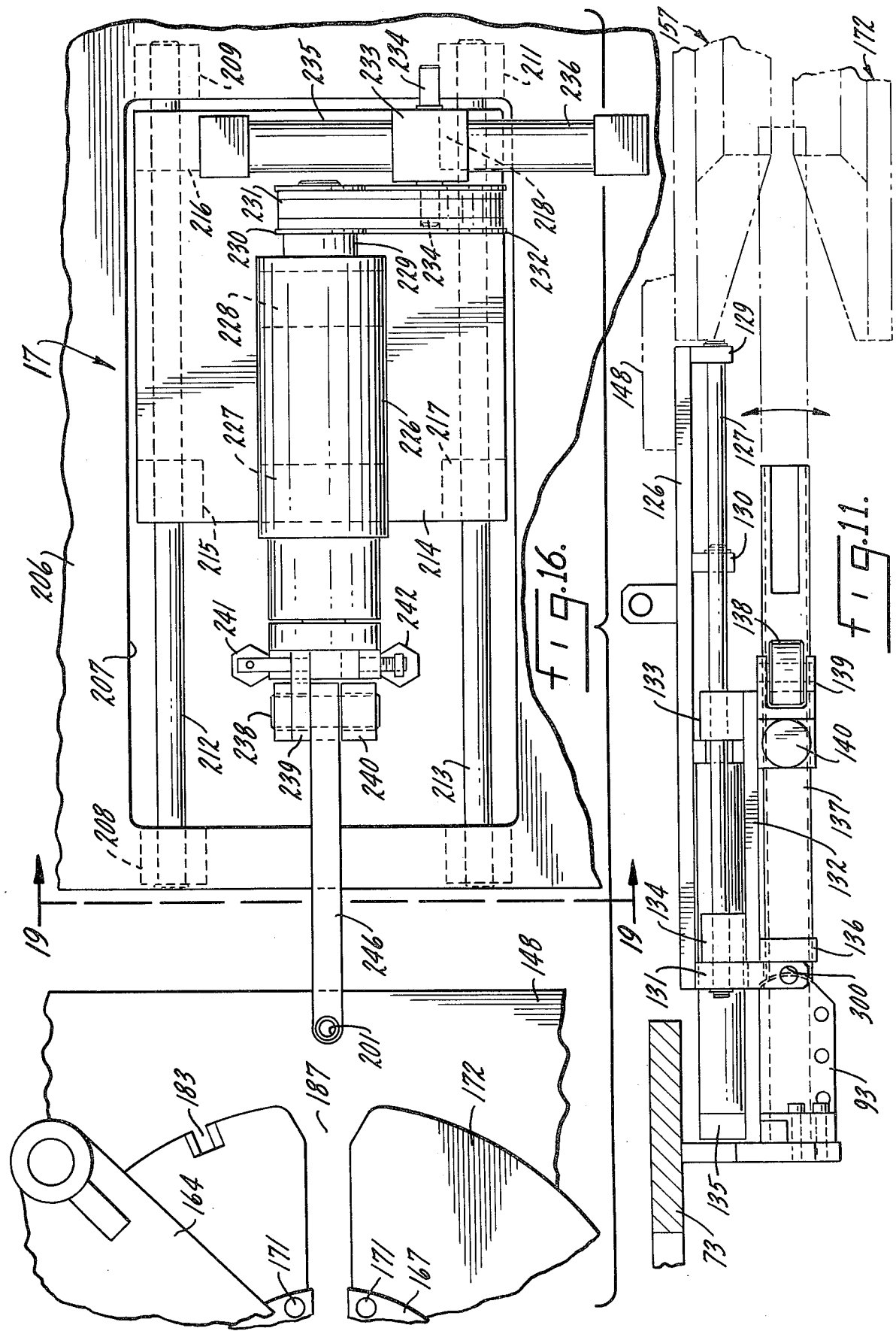

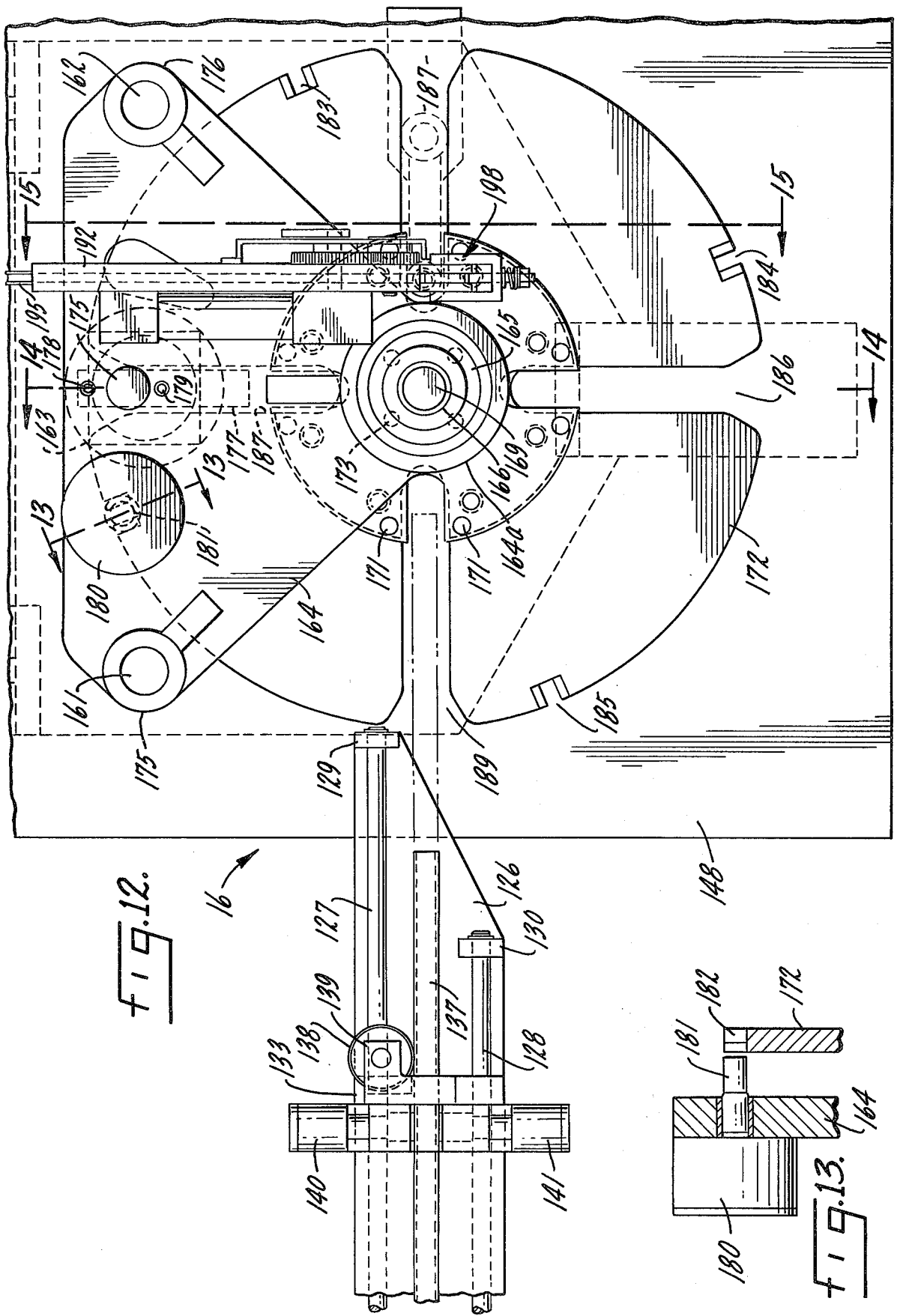

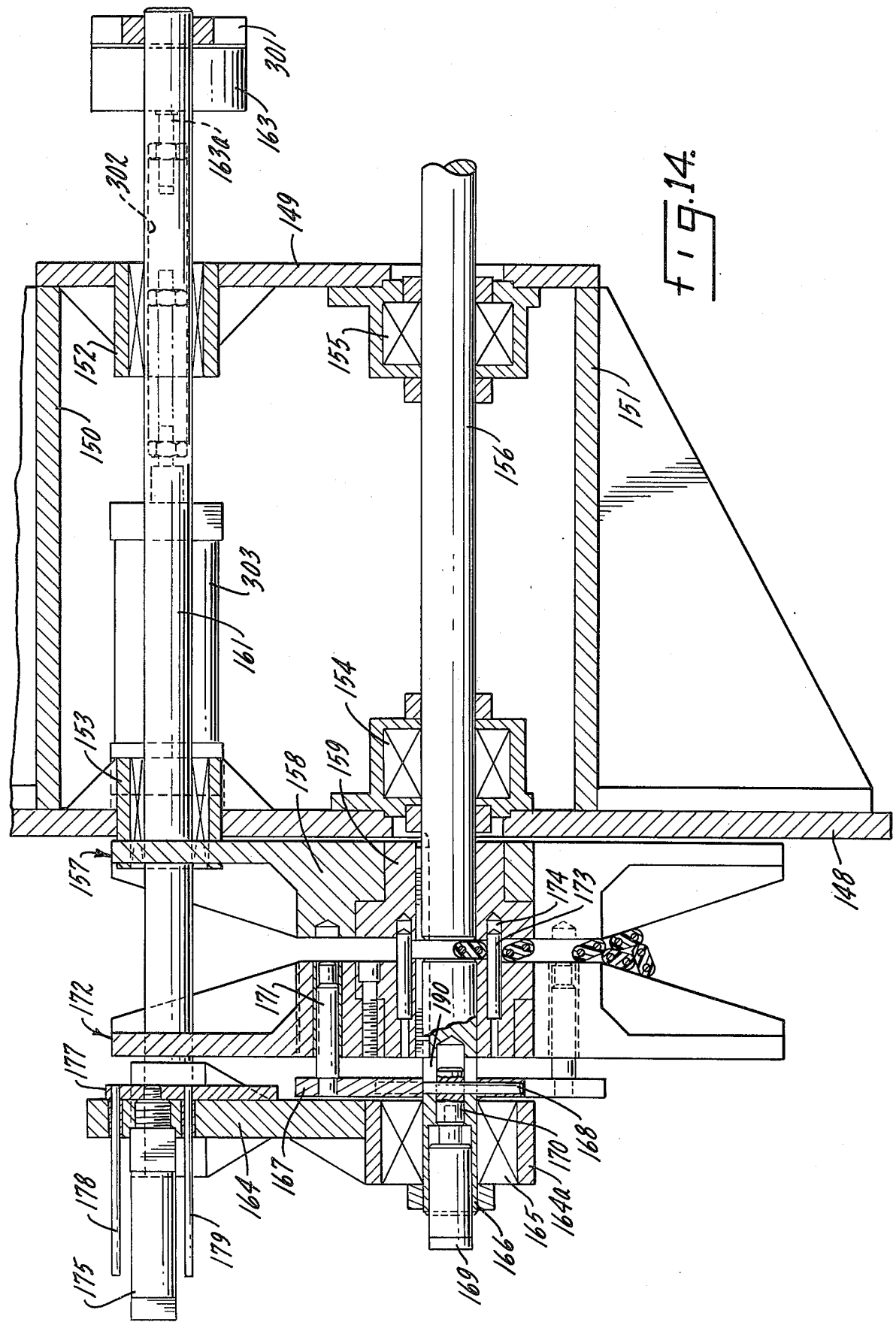

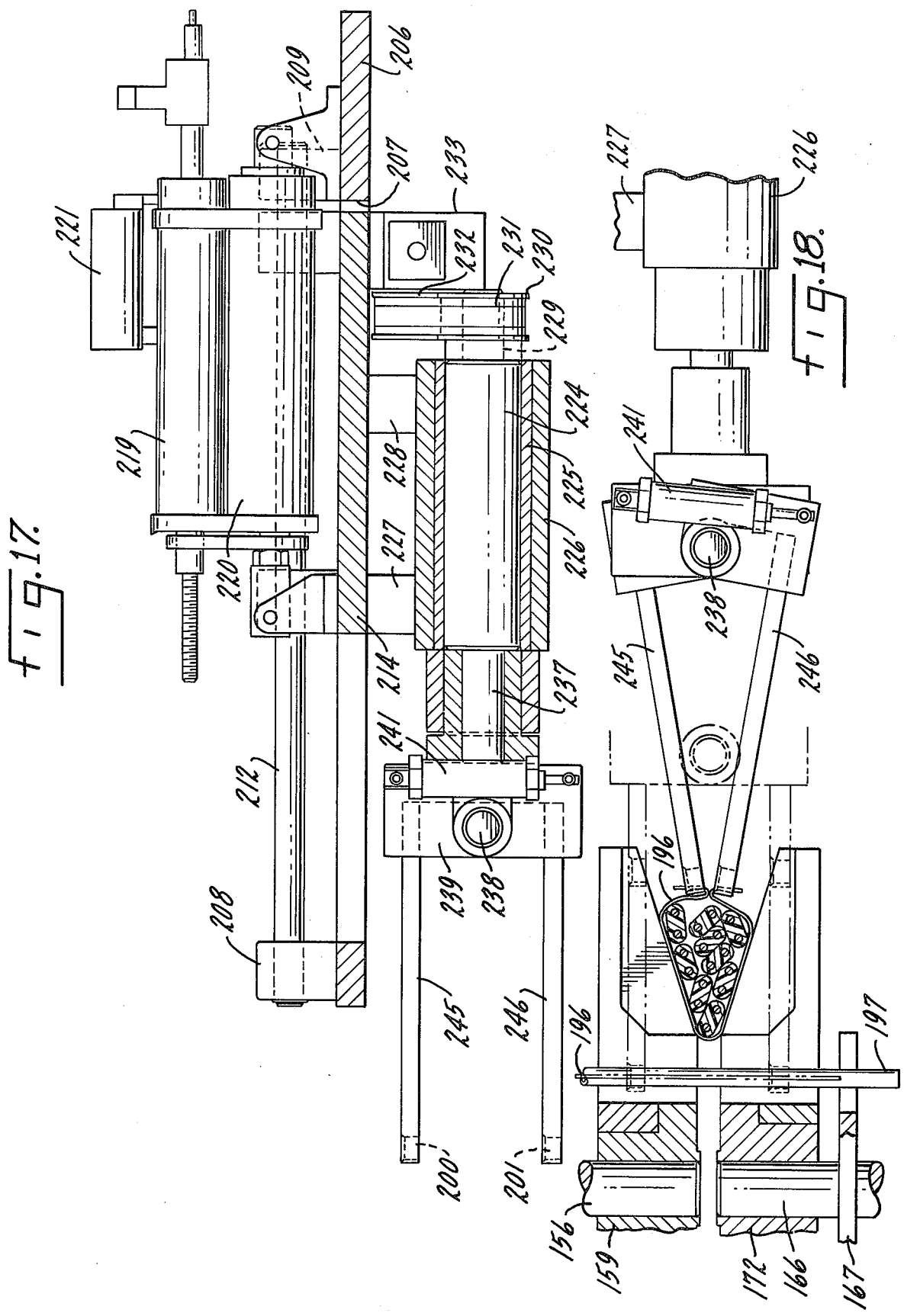

METHOD AND APPARATUS FOR FEEDING, CUTTING, STRIPPING, COILING AND TYING OFF ELONGATED FLEXIBLE MATERIAL

BACKGROUND OF THE INVENTION

In forming a tied coil of elongated, flexible material, such as the cable portion of conventional automotive battery cables, the discrete length of finish product is formed by a series of individual steps which include (1) feeding or paying off a discrete length of the elongated flexible material from a source, such as a reel, (2) cutting a discrete length of cable, (3) stripping a portion of the outer covering of the cable from an inner core portion, (4) coiling and (5) tying off and discharging. It will be understood that the stop of stripping may be optional, depending on the end use.

Prior art methods of forming discrete lengths of elongated flexible material, such as battery cables, from a source of supply, such as a supply reel which may be up to 500 feet long or a multiple thereof, have included, on a continuous basis, the performances of two or even three of the aforesaid steps. No prior art known to applicant however, discloses or suggests a method in which all of the above mentioned five steps can be carried out continuously in one, continuous coil forming operation.

SUMMARY OF THE INVENTION

The invention relates to a modular system of forming tied coils comprising a series of steps, and apparatus to perform those steps, which apparatus can be combined at will, within physical limitations, to, in maximum application, feed, cut, strip, coil, tie, and discharge discrete lengths of elongated flexible material starting from a source consisting of a length of said material which is longer than the discrete length to be coiled.

Accordingly a primary object of the invention is to provide a method of forming a coil of elongated, flexible material which includes the steps of feeding, cutting, stripping, coiling, tying off and discharging, or any physically possible combination thereof.

Another object is to provide a machine capable of performing all of the above operations in a continuous, uninterrupted operation.

Another object is to provide a machine as above discribed in which the direction of movement of the material undergoing treatment may be horizontal or vertical as desired.

Yet another object is to provide a system as above described which is modular in concept; that is, wherein the various mechanisms, each of which performs a defined function, can be combined by merely assembling individual mechanisms one to another in a unitary whole.

Other objects and advantages of the invention will become apparent from reading the following description thereof.

The invention is illustrated more or less diagramatically in the accompanying drawing wherein FIG. 1 is an elevation of a complete system for performing the individual operations of paying off, feeding, cutting, stripping, coiling, tying off and discharging in a continuous, repetitive sequence;

FIG. 6 is an enlarged front elevation of the cutting and stripping mechanism in the cutting and stripping station showing the mechanism in closed, i.e. cutting, position;

FIG. 7 is a enlarged front view with portions omitted for clarity of the cutting and stripping mechanism of the cutting and stripping station with the parts shown in open, i.e.: stripping, position.

FIG. 8 is a section view taken substantially along the line 8—8 of FIG. 6 except that the guiding mechanism is illustrated in open position;

FIG. 9 is a front elevation of the transfer station of the machine of FIG. 1;

FIG. 10 is a section view taken substantially along the line 10—10 of FIG. 9;

FIG. 11 is a top plan view of the transfer station;

FIG. 12 is a front elevation of the coiling station of the machine of FIG. 1;

FIG. 13 is a partial section view to an enlarged scale taken substantially along the line 13—13 of FIG. 12;

FIG. 14 is a section view taken substantially along the line 14—14 of FIG. 12;

FIG. 15 is a section view taken substantially along the line 15—15 of FIG. 12 illustrating, particularly, the tying mechanism;

FIG. 16 is a front elevation of the tying station of the machine of FIG. 1;

FIG. 17 is a top plan view of the tying station;

FIG. 18 is a top plan view showing the mechanism in a closed condition preparatory to twisting a tie wire; and FIG. 19 is a section view taken substantially along the line 19—19 of FIG. 16.

Like reference numerals will be used to refer to like parts from Figure to Figure in the drawing.

Figure 1:
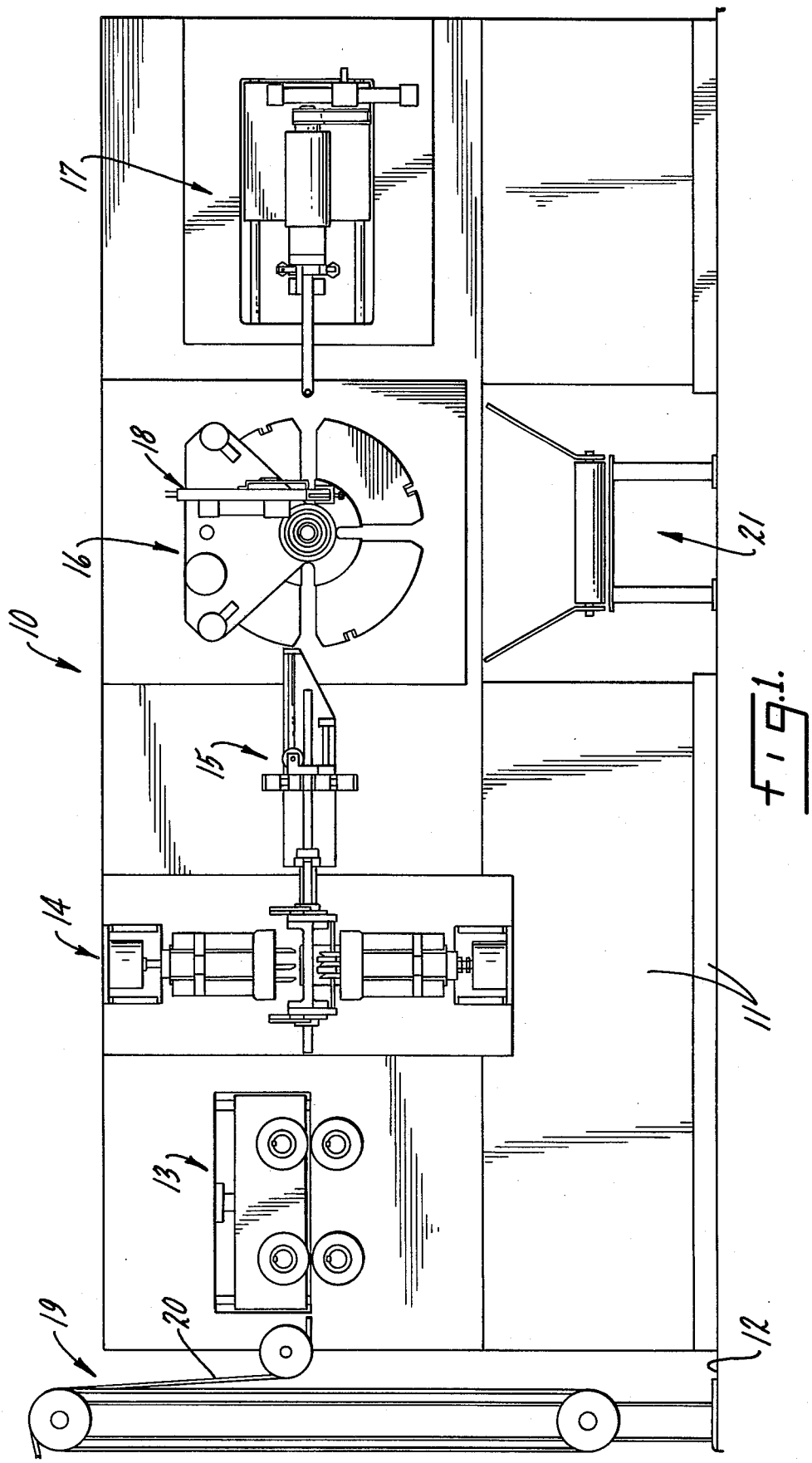

Referring first to FIG. 1, the system of the invention is illustrated generally by the reference numeral 10. The system includes, in this instance, a base structure 11 resting upon a support surface 12 such as the floor of a plant.

The base structure 11 carries a number of operation stations which are fastened thereto as by bolts or other removable securing means. In this instance the operation stations include a feed station 13, a cutting and stripping station 14, a transfer station 15, a coiling station 16 and a tie station 17. The coiling station 16 includes a tie off mechanism 18. A payoff mechanism is indicated generally at 19, which mechanism is designed and intended to function as a support for a source, not shown, of elongated, flexible material 20 to be cut and coiled. For purposes of this specification, the source of supply may be considered to be endless in the sense that after a piece of elongated flexible material has been cut and separated from the source of supply, the remaining amount is much longer than the separated piece. A discharge conveyor is indicated generally at 21 for removing coiled and tied discrete lengths of the elongated flexible material 20.

The system will be described station by station, beginning with the feed station and progressing forwardly station by station.

Feed station 13 includes a mounting plate 24 which is removably securable to the base structure 11 by any suitable means such as bolts. The mounting plate is cut away as at 25 to receive a preload bearing plate 26 which is reciprocated between an upper disengaged position and the illustrated lower, engaged position by a cylinder 27. Cylinder 27 is pivotally connected as at 28 to a mounting bracket 29 which is welded or otherwise suitably secured to the rear of mounting plate 24. A clevis 30 carried at the outer end of extendable and retractable piston rod 31 pivotally secures the piston rod, as at 32, to vertical car 33 which is fast with a bracket 34 which in turn is welded or otherwise permanently secured to the backside of bearing plate 26.

Precise, vertical, uni-path motion of the bearing plate 26 and the parts it carries is assured by a pair of shafts 35, 36 which are supported in upper and lower shaft support members 37, 38 secured as by welding to the rear of mounting plate 24. Upper and lower bearing mounting blocks 39, 40, respectively which are permanently affixed to the back of bearing plate 26 receive the shafts 35, 36 so that upon extension and retraction of piston rod 31 the bearing plate 26 will reciprocate along a fixed path.

Bearing plate 26 carries a pair of bearings, indicated generally at 41, 42, each of which supports a drive shaft 43, 44 respectively. Feed rollers 45, 46, one of which is associated with each of shafts 43, 44 respectively, are mounted on the front end of shafts 43, 44, and longitudinally fixed by spacers or other suitable means on the front side of the shafts. A driven sprocket, one of which is indicated at 47, is received on the back end of each of shafts 43, 44, and a drive belt is indicated at 48. Reinforcement brackets are indicated at 49, 50.

The mounting plate 24 is cut away to receive a pair of bearings 53, 54 similar to bearings 41, 42. The bearings are maintained rigid with respect to mounting plate 24 by reinforcement brackets indicated at 55, 56 and 57.

Figure 3:
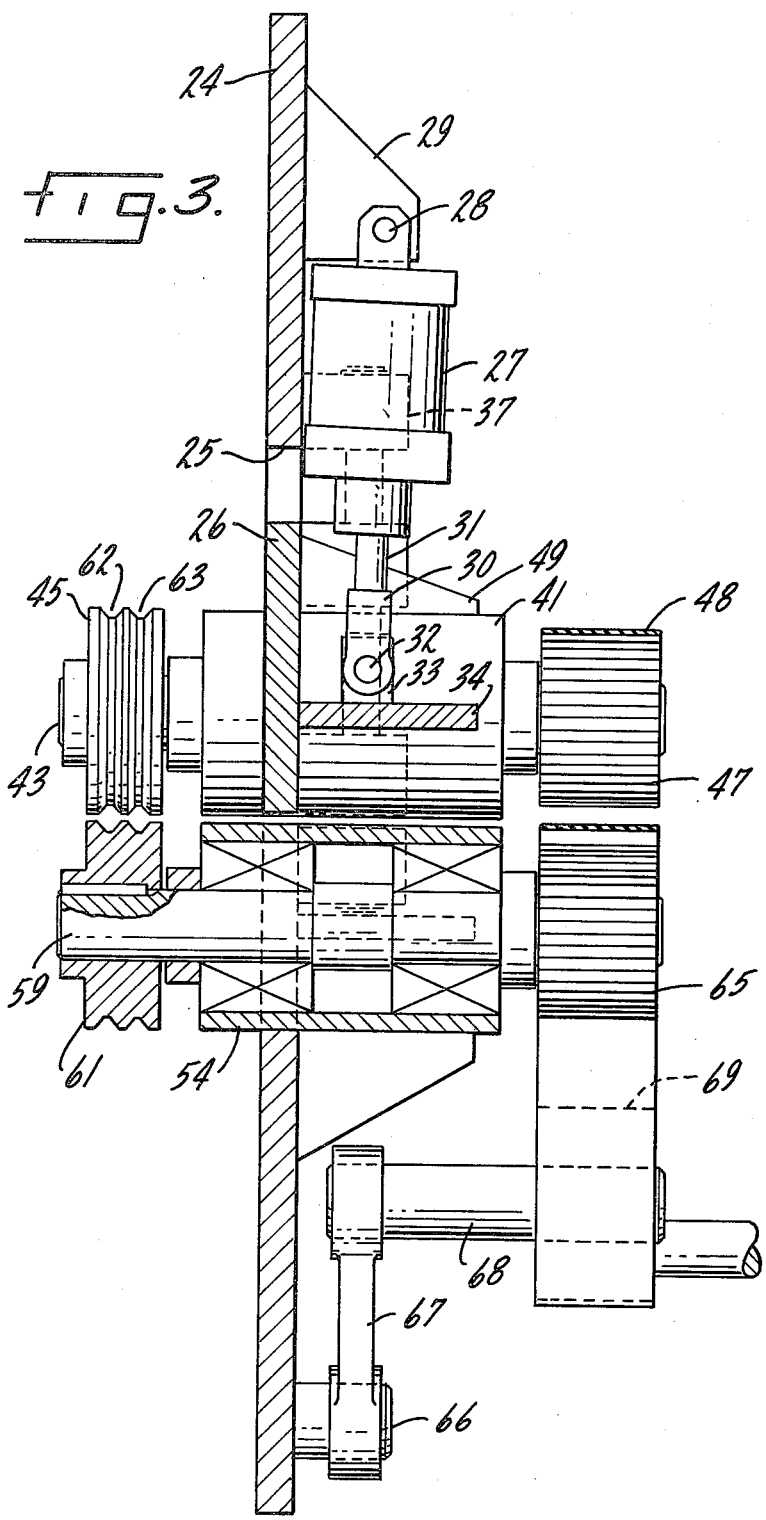
FIG. 3 is a cross section view taken substantially along the line 3—3 of FIG. 2.

The bearings 53, 54 each receive a drive shaft, indicated at 58, 59 respectively. Feed rollers 60, 61 are carried at the outer ends of drive shafts 58, 59, respectively. As best seen in FIG. 3, the lower rollers 60, 61 are directly aligned with the upper, moveable rollers 45, 46, and the surfaces of the rollers are complementary. The surfaces of the rollers have a double groove, indicated at 62, 63, formed therein for the purpose of handling two lengths of elongated flexible material simultaneously. One or more than two grooves could be employed. The grooves form a partial enclosure which is dumbbell shaped as best seen in FIG. 3.

The back end of each of shafts 58, 59 carries a drive sprocket, one of which is indicated a 65.

A stub shaft is indicated at 66. The stub shaft supports a lever arm 67 which is rotatable about the stub shaft and carries a shaft 68 at its outer end. The inwardmost end of shaft 68 carries a slack adjustment sprocket 69, or idler, which is moveable between the two positions illustrated best in FIG. 2. Tension is exerted on the lever arm 67 by a spring 70 which acts to move the lever arm 67 clockwise around stub shaft 66.

Figure 2:
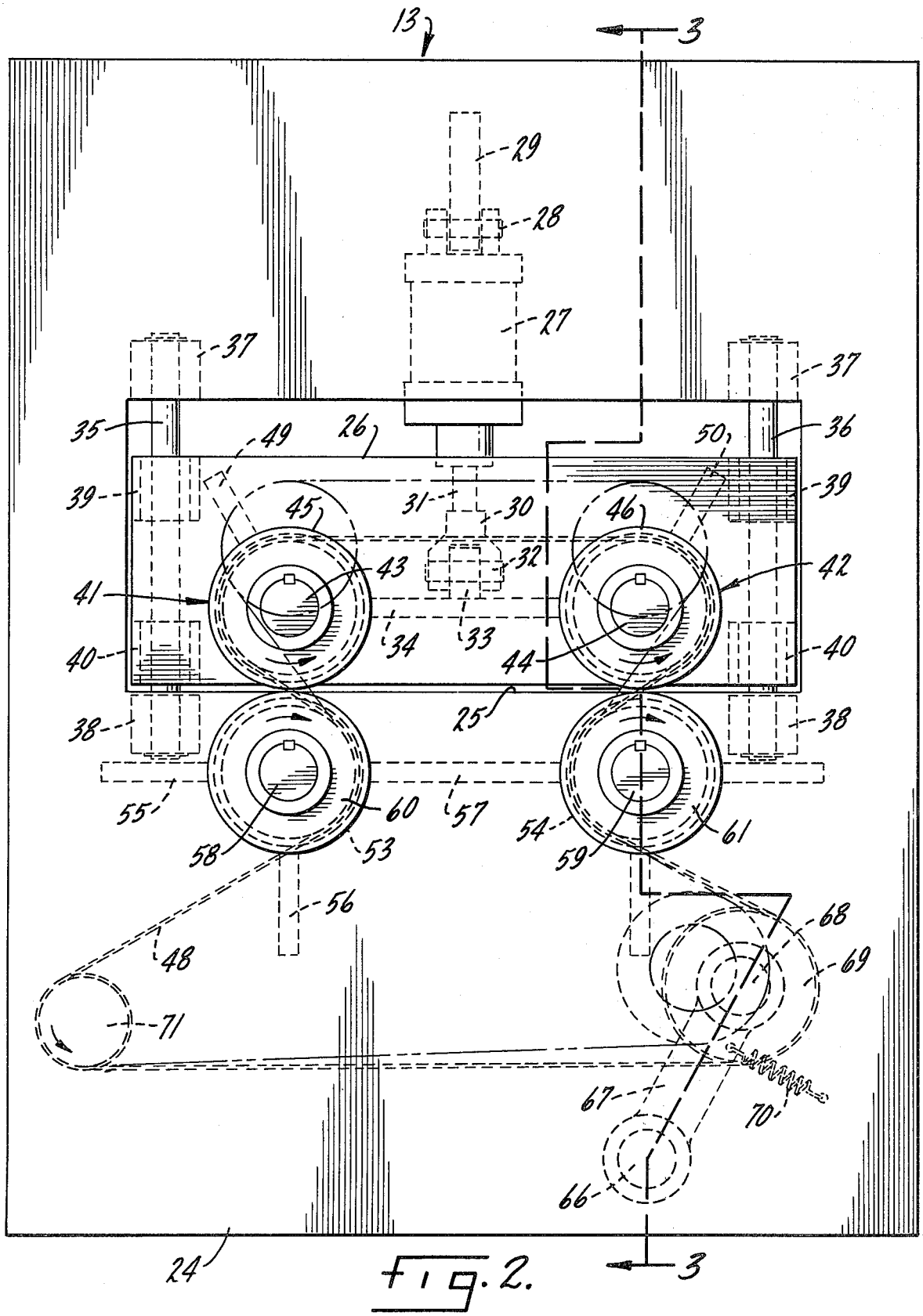
FIG. 2 is a front elevation of the feed station of FIG. 1.

From FIG. 2 it will be apparent that movement of the lever arm 67 in a clockwise direction around stub shaft 66 will tend to exert a tightening or increased tension on endless, orbital belt 48 which is driven from drive pulley 71.

The cutting and stripping station 14 is illustrated in detail in FIGS. 4 through 8, inclusive.

Station 14 includes a mounting plate 73 which may be removeably secured to base structure 11 by any suitable means such as bolts, not shown. Mounting plate 73 is apertured as at 74 to receive the ejection mechanism described hereinafter.

Figures 4, 5:
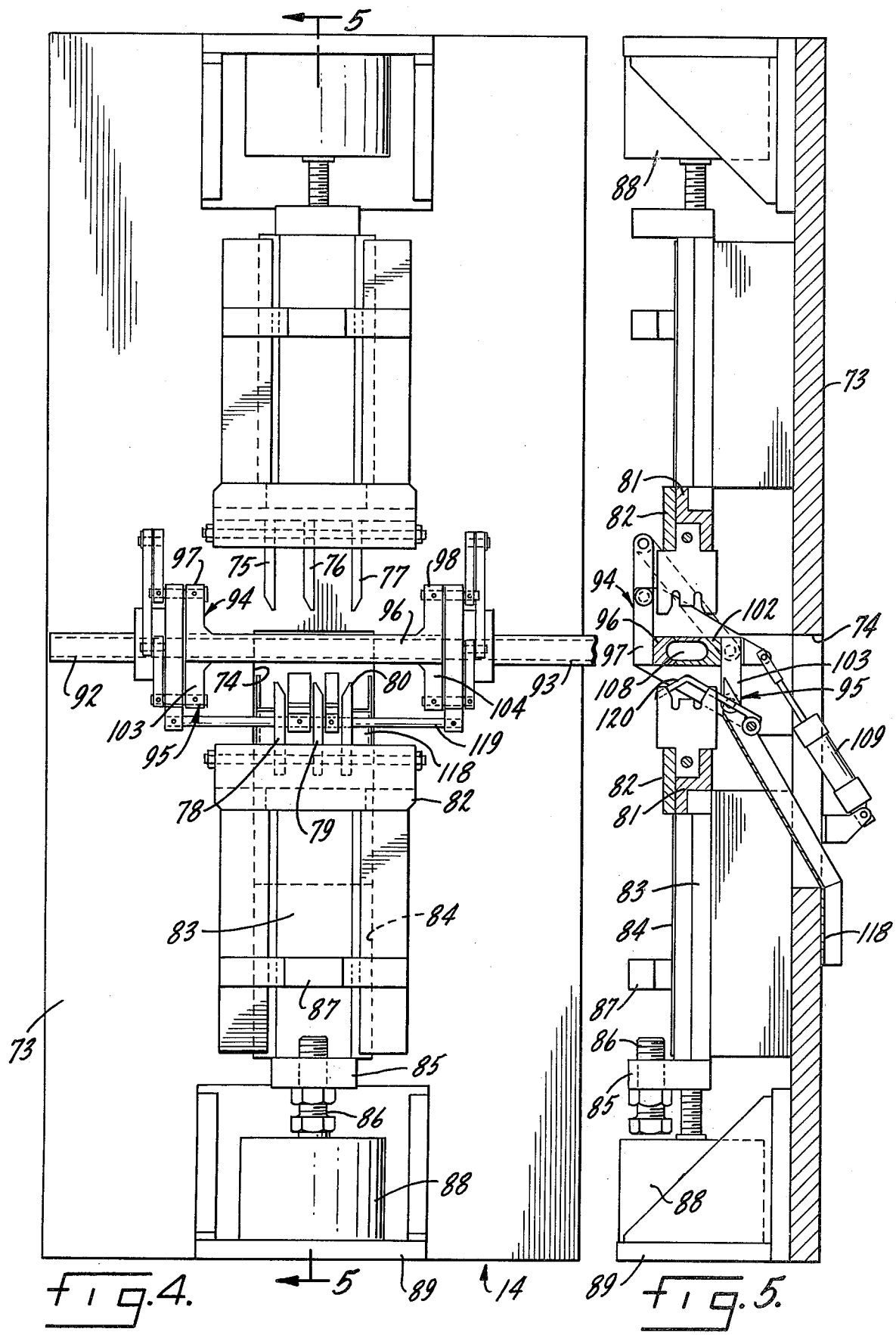
FIG. 4 is a front elevation of the cutting and stripping station of the machine of FIG. 1.
FIG. 5 is cross section view taken substantially along the line 5—5 of FIG. 4.

The cutting and stripping mechanism includes a blade set consisting of six cutting members indicated at 75 through 80 inclusive. As best seen in FIG. 4, the blade set consists of two series of three blades each. Since each series is supported by essentially the same supporting structure, only one supporting structure will be described.

Set 78–80 is carried by a blade holder 81 which includes spacer blocks 82. The blade holder in turn is carried by a slide 83 which reciprocates in a slide way 84. The slide includes at its end furthest from the blade holder a stop mounting 85 which includes an adjustable bolt 86 adapted to make engagement with a stop block 87 which is integral with the slide way 84. The slide 84 is reciprocated vertically in the slide way by cylinder 88 which is mounted on cylinder mounting bracket 89, the stop mounting 85 being secured to the threaded end of the piston rod extending from cylinder 88.

The structure for retaining and confining elongated flexible material during the cutting and stripping operation includes a pair of track members 92, 93 located on the left and right respectively of the moveable cutting and stripping mechanism.

Said structure further includes a moveable mechanism which consists essentially of a front track and hinge member 94 and a rear track and hinge memeber 95. Front track and hinge member 94 is generally U-shaped in configuration as viewed in FIG. 4 and consists of an elongated horizontally oriented section 96 and two end extensions 97, 98. The cross section configuration of horizontal section 96 is best shown in FIG. 8 in which it will be noted that the section consists of an extended lower lip 99 and a shorter, upper lip 100, the lips being spaced from one another to form an opening 101 to receive the elongated flexible material to be cut and stripped.

Similarly, rear track and hinge member 95 includes a horizontal section 102 having end extensions 103, 104. Horizontal section 102 includes an upper extended lip 105 and a shorter, lower lip 106 which form between them an opening 107. It will be seen that when the horizontal sections 96 and 102 are in their closed position illustrated best in FIG. 5, the upper and lower lips form a slide way 108 within which the elongated flexible material passes. Further, it will be noted that the lips 99 and 100 and 105, 106 of the horizontal sections 96 and 102 are continuous.

As best seen in FIG. 4 and 8, a linkage system actuated by cylinder 109 alternately moves the front and rear track and hinge members from the engaged position of FIGS. 4, 5 and 6 to the open position of FIG. 8.

Means for discharging stripped material includes a scrap shute 118 which is fastened to the rear surface of mounting plate 73. A stripper mounting rod 119 carries a stripper assembly which consists essentially of two roughly inverted L-shaped plates 120, 121 disposed directly beneath the cutting and stripping area, and located between the cutting members 75–80. The scrap diverter plates may be adjusted as needed; their primary purpose is to ensure that the stripped material is diverted away from the cutting area, with the primary diversion being rearwardly down scrap chute 118 and into a scrap receptacle, not shown.

It will be noted from FIG. 8 that when the cutting members 75–80 are in closed, cutting engagement, horizontally axised openings corresponding in size to the core of the elongated flexible material which is not to be cut are provided by the co-acting pairs of cutting members 75, 78 and 77, 80, respectively. The center pair of cutting members 76, 79, meet to cut completely through the elongated flexible material.

The sequence of operation is as follows.

Hinge members 94 and 95 close, as shown in FIGS. 4 and 5. The right, exposed, stripped end of elongated flexible material 20 which is located to the left of the left hinge mechanism, i.e.: in track member 92, then is advanced by any suitable actuation mechansim until the desired length of material is payed out, as measured from the cutting plane formed by cutting members 76, 79. The hinge members 94 and 95 then open and the cutting members 75–80 thereafter move from the FIG. 4 position to the FIG. 6 position. While the cutting members are in the FIG. 6 position, the newly formed discrete length of flexible material to the right of the cutting plane is advanced to the right, stripping the left end thereof, and the stripped material falls onto chute 121. Simultaneously, the reel is rewound, thereby stripping the right end of the material, the stripped material falling onto chute 120. The right end retracts until it stops at a location inside track member 92 preparatory to the next cycle.

The transfer station 15 is illustrated best in FIG. 9 through 12 inclusive.

Referring first to FIGS. 9, 10, and 11, a static plate is indicated at 126. Upper and lower rods 127, 128 are carried by front mounting brackets 129, 130 and a rear mounting and pivot bracket 131. In this connection it should be noted that the terms "front" and "rear" and "forward" or "backward" are used in the sense of comparison against the direction of travel of elongated flexible material through the system.

A carriage plate is indicated at 132, the carriage plate having a front guide 133 through which upper rod 127 passes. A rear bushing 134 is fast with the rear mounting and pivot bracket 131. An air cylinder as indicated at 135, the piston rod of the air cylinder being connected to an extension 146 of the carriage plate 132.

A rear track mounting bracket 136 is fast with the rear mounting and pivot bracket 131 and receives a wire guide track 137. Upward movement of the wire is precluded by a cam roll 138 which is carried by forward track mounting bracket 139, which in turn is fast with carriage plate 132.

A pair of gripping cylinders are indicated at 140, 141, the ends of the piston rods of which carry grip pads 142, 143. It will be understood that the cylinders are secured to running brackets 144, 145 which in turn are connected to carriage plate 132.

It will thus be seen that extension and retraction of the piston rod of air cylinder 135 will cause wire guide track 137 to reciprocate horizontally, the extent of the reciprocation depending upon the stroke of cylinder 135.

Static plate 126 is pivotally mounted to track member 93 by a pair of axially aligned stub shafts 300. The static plate 126 is moved horizontally in the directions indicated by the double headed arrow of FIG. 11 by any suitable means, such as an air cylinder connected to the clevis (unmembered) which projects rearwardly from plate 126.

The coiling station 16 is illustrated best in FIG. 12 through 15 inclusive.

The coiling station includes a mounting plate 148 which may be removably secured by bolts or other suitable means to base structure 11. A rear bearing plate 149, FIG. 14, is mounted in fixed, spaced relation to the mounting plate 148 by spacer members 150, 151. The mounting plate 148 and rear bearing plate 149 are apertured to receive two pairs of bushings, one pair being indicated at 154, 155, these bearings receiving drive shaft 156. Drive shaft 156 carries, at its left end, an inside drum adaptor 157 which is circular in configuration and includes a hub portion 158 which is aperture to received an inside drum bushing 159 which is connected to main drive shaft 156 by a key or other suitable means. The inside drum adaptor 157 by a key or other suitable means. The inside drum adaptor 157 does not move longitudinally with respect to the axis of drive shaft 156.

A traveling drum plate is indicated at 164, said plate terminating at its lower extremity in a bearing housing 164a. The traveling drum plate carries in housing 164a, a bearing 165 which receives a driven shaft 166. Shaft 166 carries a coil pin plate 167 having eight pins 171 integral therewith. The coil pin plate is maintained vertically oriented with respect to the traveling drum plate by a pin 168 which is received in a slot 190 formed in the approximate center portion of driven shaft 166.

The coil pin plate 167 is reciprocated by an air cylinder 169, the piston rod of which is connected at its inner end to an inner shaft 170 through which the pin 168 passes.

The coil pin plate carries eight coiling pins 171 which are received in suitable apertures in the outside drum adaptor 172. The outside drum adaptor 172 is further centrally apertured to receive the inner or right end of driven shaft 166, which shaft is keyed or otherwise secured to the drum portion of drum adaptor 172. A plurality of combination coiling and drive pins are indicated at 173 carried by the outside drum adaptor and disposed to be received within sockets 174 formed in inside drum adaptor 157. When drum adaptors 157 and 172 are in closest engagement, feed tube 137 received therein as illustrated in the dotted line position of tube 137 in FIG. 12. It will be understood that in operation, the right end of the discrete length of elongated flexible material will project outwardly from tube 137. After the tube 137 reaches the dotted line position of FIG. 12, the drum adaptors close, thereby clamping the end of the material 20 therebetween, and then tube 137 retracts prior to rotation of the engaged drum adaptors.

A pair of collars are indicated at 175, 176, each collar being welded to the traveling drum plate 164, said collars receiving shafts 161, 162 respectively.

An aligning cylinder 180 is carried by traveling drum plate 164, the aligning cylinder including a piston rod 181, see FIG. 13, which, when extended, passes into a slot 182 formed in the outer circumference of outside drum adaptor 172. Similar slots are indicated at 183, 184 and 185 for purposes of alignment of the traveling drum plate with the outside drum adaptor 172.

As best seen in FIG. 12, outside drum adaptor has four equally spaced slots 186 through 189 respectively of a size to receive the end of feed tube 137.

The tie off mechanism 18 is illustrated best in FIGS. 12, 15, 18 and 19.

Referring first to FIGS. 12 and 15, it will be noted that the tie off mechanism includes a vertical track 192 which is carried on the outside or left edge of a spacer structure 193 which in turn is secured by any suitable means, such as bracket 194, to the outside surface of traveling drum plate 164. A direction changing roller is indicated at 195 so that the direction of movement of the tying material 196 is directed vertically downwardly and then, near the lower end of vertical track 192, inwardly toward the aligning tube 197. The tie wire is driven, and tension is imposed on it by, any suitable driving and tensioning mechanism indicated generally at 198. As can be best visualized from FIG. 18 and the alignment sockets 200 and 201 in FIG. 19, the alignment tube 197 is reciprocated into and out of a position in which it is aligned with the discharge end 202 of the tie off mechanism. As best seen in FIG. 15, the aligning tube 197 is reciprocated by an extension 203 of an air cylinder, not shown.

The balance of the tie off mechanism is illustrated best in FIGS. 16, 17, 18 and 19.

Referring first to FIG. 16, it will be noted that the tie off mechanism includes a mounting plate 206 which is apertured as at 207. A plurality of upper bearing blocks 208, 209 and lower bearing blocks 210, 211 are fast with the rear face of mounting plate 206. An upper bearing rod is indicated at 212, and a lower bearing rod at 213.

An actuator plate is indicated at 214, the plate including a pair of upper guide sleeves 215, 216 and lower guide sleeves 217, 218 which receive the upper and lower bearing rods 212, 213 respectively, whereby the actuator plate 214 is permitted to slide back and forth within the confines of aperture 207.

Actuator plate 214 is moved forward and backward by the action of a pair of actuator plate movement cylinders 219, 220 under the control of valve 221 as shown best in FIGS. 17 and 19.

The front or outside face of actuator plate 214 carries a twisting shaft 224 which is received in sleeve 225 which in turn is carried in bearing 226 which in turn is secured to the actuator plate 214 by weldments 227, 228.

The right end 229 of shaft 224 carries a pulley 230 which is connected by belt 231 to a larger pulley 232 extending out of bearing housing 233. Larger pulley 232 is carried by a shaft 234, see FIG. 16, which is rotated in a clockwise or counterclockwise direction depending upon which one of rotation cylinders 235, 236 is actuated. Thus, and depending upon which rotation cylinder 235, 236 actuated, the shaft and the twisting shaft 225 will be rotated in a clockwise or counterclockwise direction.

The left end of shaft 224 is flatted top and bottom as indicated at 237 in FIG. 19 and receives a pivot pin 238. The pin receives two dog member assemblies 239, 240 which are arranged for rotational movement about the axis of pivot pin 238 by virtue of pivot cylinders 241, 242, each of which is pin connected as at 243, 244 to a respective dog member 239, 240.

Each of the dog members 239, 240 has an outwardly extending arm 245, 246, each of which carries an alignment socket 200, 201 respectively.

It will thus be seen that the arms 245, 246 are reciprocated horizontally from a retracted position in which the sockets 200, 201 are in the retracted position of FIG. 16, to an extended position in which the sockets are in the dotted line position of FIG. 18. This is accomplished by actuation of one or the other of reciprocating cylinders 219, 220.

The arms 245, 246 are maintained in parallel relationship to one another as illustrated in FIG. 17, or moved toward and away from one another about the axis of pin 238 as illustrated in FIG. 18, by actuation of an appropriate one of pivot cylinders 241, 242.

An finally, rotation of the entire assembly, that is, particularly arms 245 and 246, is controlled by the direction of rotation of shaft 224 which is under the control of one or the other of rotation cylinders 235 annd 236.

Although a prefered embodiment of the invention has been illustrated and described, it will at once be apparent to those skilled in on the art that modifications may be made within the spirit and scope of the invention.

For example, the stripping operation may be omitted entirely if the job requirement is merely that a plurality of coils of elongated flexible material having a uniform diameter from end to end be provided.

On the other hand, it will frequently be desirable to form a coil of discrete length of elongated flexible material in which the ends are stripped, as would be the case with cables intended for use as battery cables wherein terminals are to be connected to the ends of the discrete length of material.

Accordingly the scope of the invention should be limited not by the scope of the foregoing exemplary description but solely by the scope of the hereinafter appended claims when interrupted in light of the pertinent prior art.

I claim:

1. In a method of forming coiled and tied lengths of elongated flexible material from continuous stock in a continuous process, the steps of
    feeding elongated flexible material from a continuous stock into and through a cutting station,
    cutting said elongated flexible material to thereby form a discrete length of said elongated flexible material,
    winding said length of material into a multi-loop coil,
    tying said multi-loop coil at a tying station, and
    discharging said tied coil from the typing station.

2. The method of claim 1 further characterized
    firstly, in that said elongated flexible material includes a covering within which a core is received, and
    secondly, in that the covering of at least one end of the discrete length of said elongated flexible material is stripped prior to the winding of said discrete length of material into a multi-loop coil.

3. The method of claim 2 further characterized in that
    the covering at the end of the continuous stock adjacent the cut end of a preceding discrete length of material is stripped prior to the feeding of the balance of the continuous stock through the cutting station.

4. The method of claim 3 further characterized in that
    the stripping of the adjacent ends of the discrete length and the continuous stock occurs simultaneously.

5. The method of claim 4 further characterized in that
    said simultaneous stripping action occurs substantially simultaneously with said cutting action.

6. The method of claim 2 further characterized in that
    said stripping occurs substantially simultaneously with said cutting.

7. Apparatus for forming coiled and tied lengths of elongated flexible material from endless stock in a continuous processing system, said apparatus including
means for feeding elongated flexible material from an endless supply to cutting means,
means for cutting said material into discrete lengths,
means for feeding said discrete lengths to coiling means,
means for coiling said discrete lengths into a coil,
means for tying said coil, and
means for ejecting said tied coil from the continuous processing system.

8. The apparatus of claim 7 further characterized by and including
means for interrupting the feeding movement of said endless stock for a period of time sufficient to enable the cutting action to be carried out while the stock is stationary.

9. The apparatus of claim 8 further including
means for stripping an external portion of the stock from at least one end portion of a discrete length of stock.

10. The apparatus of claim 9 is further characterized in that
the stripping means is associated with the cutting means whereby stripping occurs immediately subsequent to cutting.

11. The apparatus of claim 10 further characterized in that the feeding means includes
means for reversing the direction of movement of the end portion of the continuous stock associated with the stripped material to thereby remove the stripped material from the cutting and stripping area.

12. The apparatus of claim 11 further characterized in that
the means for reversing the direction of the movement of the end portion of the endless stock comprises
means to reverse the direction of operation of the feed means whereby the stripped material may be pulled away from the undisturbed core material of the elongated flexible material.

* * * * *